(12) United States Patent
Fujiwara et al.

(10) Patent No.: US 7,983,006 B2
(45) Date of Patent: Jul. 19, 2011

(54) SUSPENSION FOR DISC DRIVE APPARATUS

(75) Inventors: Tetsuya Fujiwara, Yokohama (JP); Noriyuki Saito, Yokohama (JP); Takumi Karasawa, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 844 days.

(21) Appl. No.: 11/879,159

(22) Filed: Jul. 16, 2007

(65) Prior Publication Data
US 2008/0049360 A1    Feb. 28, 2008

(30) Foreign Application Priority Data
Aug. 22, 2006   (JP) ................... 2006-225706

(51) Int. Cl.
*G11B 5/48* (2006.01)
*G11B 21/16* (2006.01)

(52) U.S. Cl. ............... 360/245.2; 360/244.5; 360/245.9
(58) Field of Classification Search ............... 360/244.5, 360/245.2, 245.8, 245.9
See application file for complete search history.

(56) References Cited

U.S. PATENT DOCUMENTS

| | | | | |
|---|---|---|---|---|
| 6,522,503 B2 * | 2/2003 | Takadera et al. | ........... | 360/245.2 |
| 6,571,455 B2 | 6/2003 | Takagi et al. | | |
| 2004/0001289 A1 * | 1/2004 | Yao et al. | ................... | 360/294.4 |
| 2004/0078958 A1 * | 4/2004 | Jenneke | ....... | 29/603.03 |
| 2006/0236527 A1 * | 10/2006 | Davis et al. | ............... | 29/603.12 |

FOREIGN PATENT DOCUMENTS

| | | |
|---|---|---|
| JP | 11-110924 A | 4/1999 |
| JP | 2000-163904 A | 6/2000 |
| JP | 2002-133808 A | 5/2002 |
| JP | 3684351 B2 | 6/2005 |

OTHER PUBLICATIONS

Japanese Office Action dated Mar. 22, 2011 (and English translation thereof) in counterpart Japanese Application No. 2006-225706.

* cited by examiner

*Primary Examiner* — Craig A. Renner
*Assistant Examiner* — Adam B Dravininkas
(74) *Attorney, Agent, or Firm* — Holtz, Holtz, Goodman & Chick, PC (57) ABSTRACT

A suspension has a load beam and a flexure having a tongue portion to which a slider is attached. The load beam has a pin insertion hole formed between a proximal portion of the load beam and the slider and an opening formed between a distal portion of the load beam and the slider. A first locating pin is inserted into the pin insertion hole, and a second locating pin into the opening. An extending portion is formed on a distal portion of the flexure. The flexure has a first locating hole in which the first locating pin is inserted and a second locating hole in which the second locating pin is inserted. The second locating hole is formed in the extending portion.

3 Claims, 8 Drawing Sheets

SUSPENSION FOR DISC DRIVE APPARATUS

CROSS-REFERENCE TO RELATED APPLICATIONS

This application is based upon and claims the benefit of priority from prior Japanese Patent Application No. 2006-225706, filed Aug. 22, 2006, the entire contents of which are incorporated herein by reference.

BACKGROUND OF THE INVENTION

1. Field of the Invention

This invention relates to a suspension for a disc drive apparatus used in an information processing apparatus, such as a personal computer.

2. Description of the Related Art

A hard disc drive apparatus (HDD, hereinafter referred to simply as a disc drive apparatus) is used in an information processing apparatus, such as a personal computer. The disc drive apparatus comprises a magnetic disc that is rotated by a spindle motor, a carriage turnable around a pivot, etc. A suspension for the disc drive apparatus (hereinafter referred to simply as a suspension) is provided on an arm of the carriage.

The suspension has a load beam fixed to the carriage, a flexure fixed overlapping the load beam, etc. A slider is attached to a tongue portion that is formed on the flexure. The slider is swingable in a roll direction or a pitch direction around a dimple that is formed on the load beam. The slider is provided with an element (transducer) for reading or writing data.

The flexure is fixed in a predetermined position on the load beam by laser welding or the like. In contrast, the slider is fixed the tongue portion of the flexure with an adhesive or the like with the dimple of the load beam as a reference. Further, the flexure is formed having pads that are electrically connected to terminals of the slider.

In order to ensure the connection between the terminals of the slider and the pads, the respective positions of the terminals and the pads should be regulated accurately. Unless the pads of the flexure are accurately positioned with respect to the dimple of the load beam, a dislocation may possibly be caused between the terminals of the slider and the pads. If the dislocation occurs, the connection (or bonding) between the terminals of the slider and the pads is subject to a failure.

Locating holes are formed in the conventional load beam and flexure, individually. In fixing the flexure to the load beam, locating pins are inserted into the locating holes, individually. The load beam and the flexure are positioned with respect to each other by the locating pins. Suspensions of this type are described individually in Jpn. Pat. Appln. KOKAI Publication No. 2000-163904 (Patent Document 1) and Jpn. Pat. No. 3684351 (Patent Document 2).

The suspension described in Patent Document 1 has first and second locating holes. These locating holes are formed in positions near respective proximal portions of the load beam and the flexure. Accordingly, the distance from each locating hole to pads is great. Even if the load beam and the flexure are positioned by the locating holes, therefore, a dislocation may possibly be caused between the pads and the terminals of the slider.

The suspension described in Patent Document 2 also has first and second locating holes. These locating holes are formed individually between respective side parts of a proximal portion of load beam and a proximal portion of the flexure. Also in this suspension, the distance from each locating hole to the pads is great. Even if the load beam and the flexure are positioned by the locating holes, therefore, a dislocation may possibly be caused between the pads and the terminals of the slider.

Figure 8:
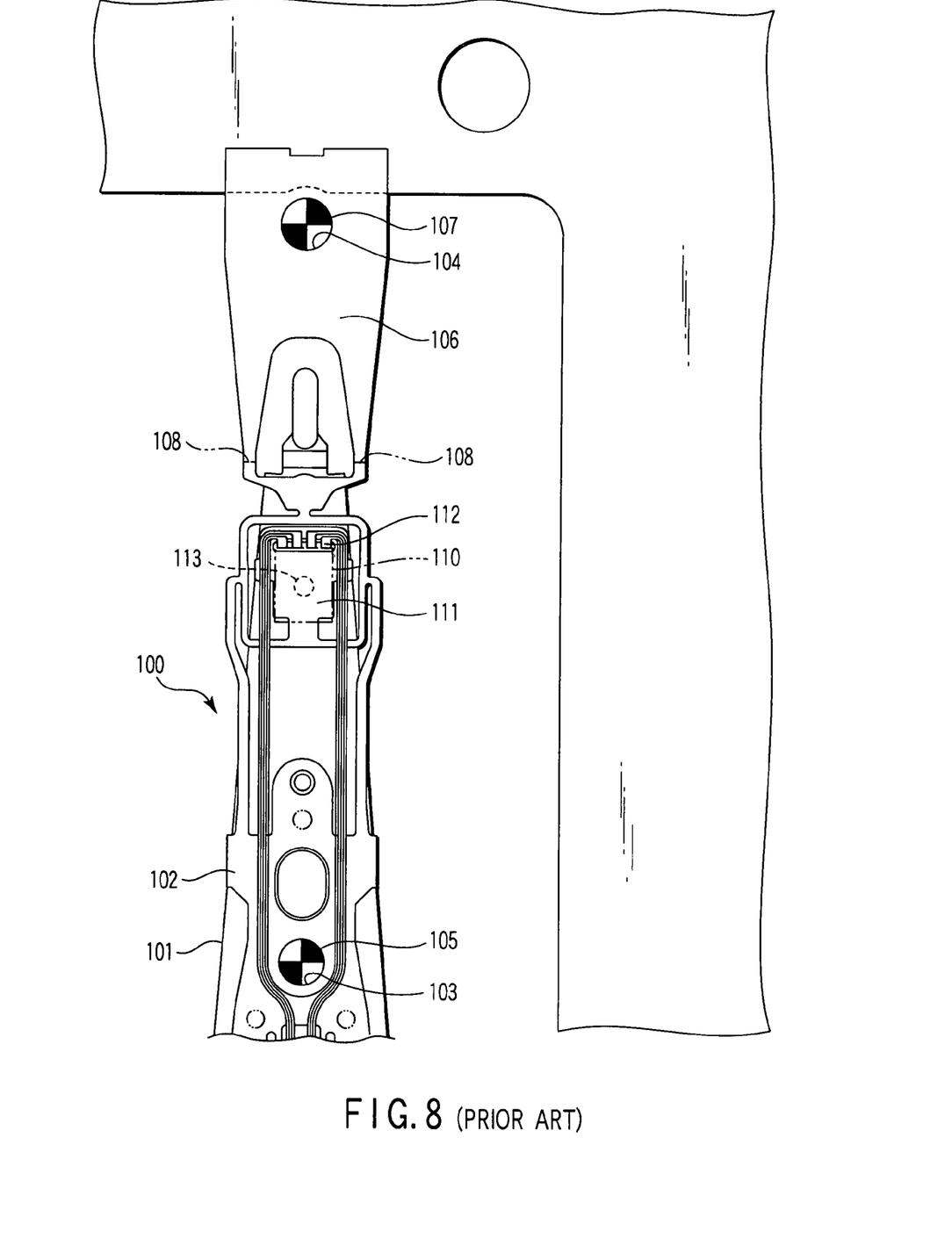
FIG. 8 is a plan view showing a state before a conventional suspension is separated from a frame.

FIG. 8 shows a conventional suspension 100. The suspension 100 has first and second locating holes 103 and 104, which serve to position a load beam 101 and a flexure 102 with each other. The first locating hole 103 is formed in respective longitudinally intermediate portions of the load beam 101 and the flexure 102. A first locating pin 105 can be inserted into the locating hole 103. The second locating hole 104 is formed in an extending portion 106 that protrudes from a distal portion of the flexure 102. A second locating pin 107 can be inserted into the locating hole 104.

The load beam 101 and the flexure 102 are positioned with respect to each other by the locating pins 105 and 107. The load beam 101 and the flexure 102 are fixed together by laser welding or the like. If a cutoff portion 108 is cut, thereafter, the extending portion 106 is separated from the flexure 102. A tongue portion 111 to which a slider 110 is attached is provided on the distal portion of the flexure 102. The tongue portion 111 is provided with pads 112. The pads 112 are electrically connected to terminals of the slider 110. The slider 110 is fixed to the tongue portion 111 based on the position of a dimple 113 as a reference. The dimple 113 is provided on the load beam 101.

The conventional suspension 100 shown in FIG. 8 has the second locating hole 104, which is formed on the extending portion 106. Since the extending portion 106 projects beyond the distal end of the load beam 101, the distance from the second locating hole 104 and each pad 112 is great. Even if the load beam 101 and the flexure 102 are positioned by the locating hole 104, therefore, a dislocation may possibly be caused between each pad 112 and each terminal of the slider 110.

Since the extending portion 106 of the suspension 100 shown in FIG. 8 projects greatly from the distal end of the flexure 102, moreover, the overall length of the flexure 102 including the extending portion 106 is great. A large number of flexures 102 are simultaneously manufactured by etching one metal plate. The conventional flexures 102 each having the extending portion 106 that can be obtained from one metal plate are fewer than flexures that have no extending portion 106. Thus, the flexures 102 have a problem of high cost.

BRIEF SUMMARY OF THE INVENTION

The object of this invention is to provide a suspension for a disc drive apparatus, in which the respective positions of a load beam and pads of a flexure can be located accurately.

According to this invention, there is provided a suspension for a disc drive apparatus, which comprises a load beam having a proximal portion and a distal portion and a flexure fixed overlapping the load beam and having a tongue portion to which a slider is attached. In this suspension, the load beam has a pin insertion hole which is formed between the proximal portion of the load beam and the slider and in which a first locating pin is inserted and an opening which is formed between the distal portion of the load beam and the slider and in which a second locating pin is inserted. The flexure has a pad which is formed corresponding in position to a terminal of the slider and to which the terminal is connected, an extending portion formed so as to be situated between the pad of the flexure and the distal portion of the load beam and inside the distal portion of the load beam, a first locating hole which is formed in a longitudinally intermediate portion of the flexure and in which the first locating pin is inserted, and a second locating hole which is formed in the extending portion and in which the second locating pin is inserted.

As the first locating pin is inserted into the pin insertion hole of the load beam and the first locating hole of the flexure, the respective longitudinally intermediate portions of the load beam and the flexure are positioned. Further, the distal side of the flexure is positioned as the second locating pin is inserted into the second locating hole of the flexure. Between the pad and the distal portion of the load beam, the second locating hole in the extending portion is situated inside the load beam. According to this arrangement, the distance from the second locating hole to the pad can be shortened. Thus, that part of the flexure near the pad can be accurately positioned by means of the second locating pin that is inserted in the second locating hole.

In an aspect of the invention, the extending portion of the flexure is provided with a fixing portion with which the extending portion is fixed to the load beam. In another aspect of the invention, the suspension comprises the extending portion located inside the opening of the load beam, a fixing portion for fixing the flexure to the load beam, the fixing portion being formed between the extending portion and the tongue portion, and a cutoff portion for separating the extending portion, the cutoff portion being formed between the extending portion and the fixing portion and configured to be cut with the flexure fixed to the load beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the preferred embodiments given below, serve to explain the principles of the invention.

DETAILED DESCRIPTION OF THE INVENTION

A suspension 10A for a disc drive apparatus according to a first embodiment of the present invention will now be described with reference to FIGS. 1 to 5.

Figure 1:
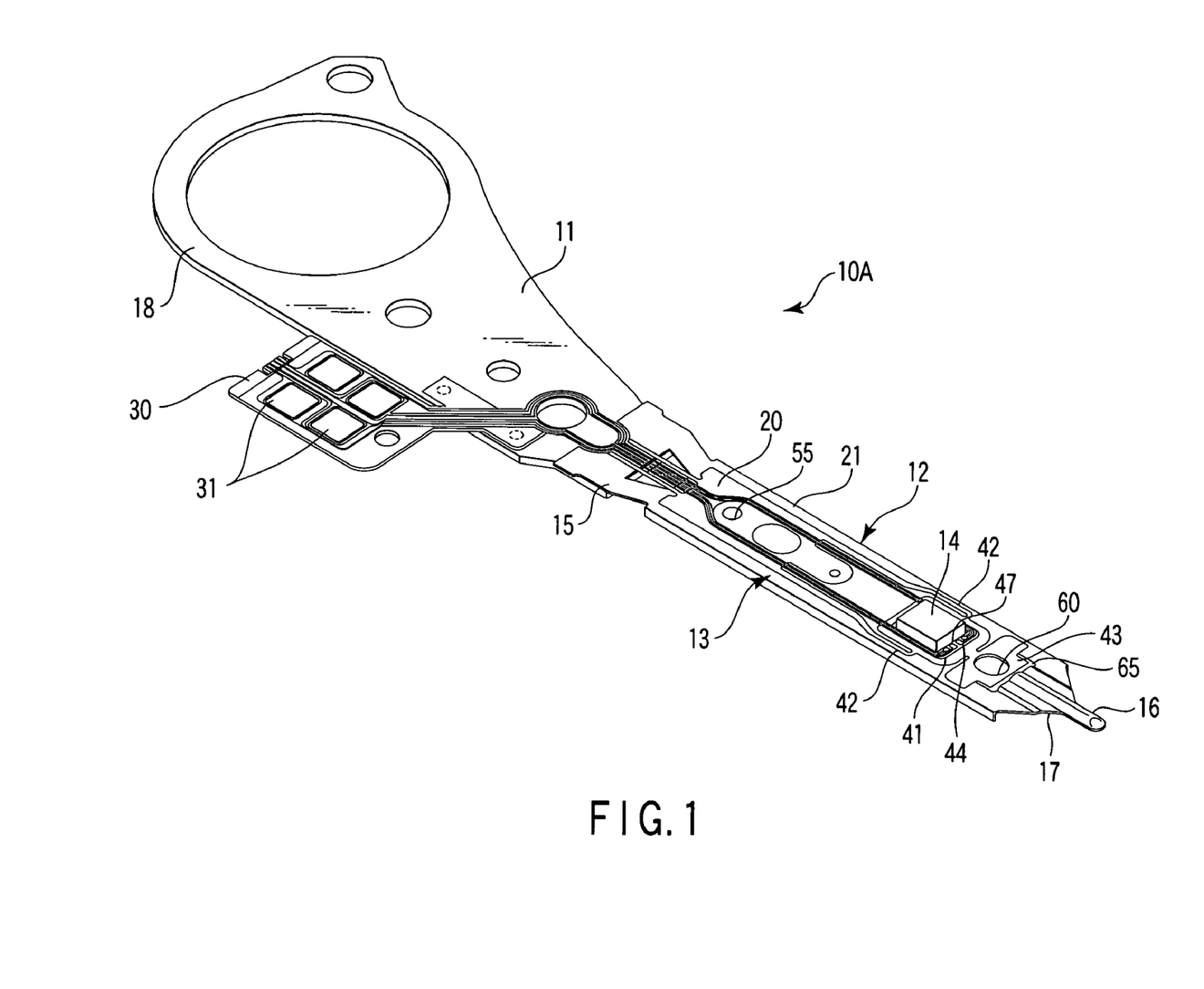
FIG. 1 is a perspective view of a suspension for a disc drive apparatus according to a first embodiment of the invention.

The suspension 10A shown in FIG. 1 comprises a base plate 11, a load beam 12, a flexure 13, a slider 14 that serves as a magnetic head, etc. The load beam 12 has a proximal portion 15 fixed to the base plate 11 and a distal portion 17. If necessary, a loading/unloading tab 16 is formed on the distal portion 17. A rear portion 18 of the base plate 11 is fixed to an arm of a carriage (not shown).

Figure 2:
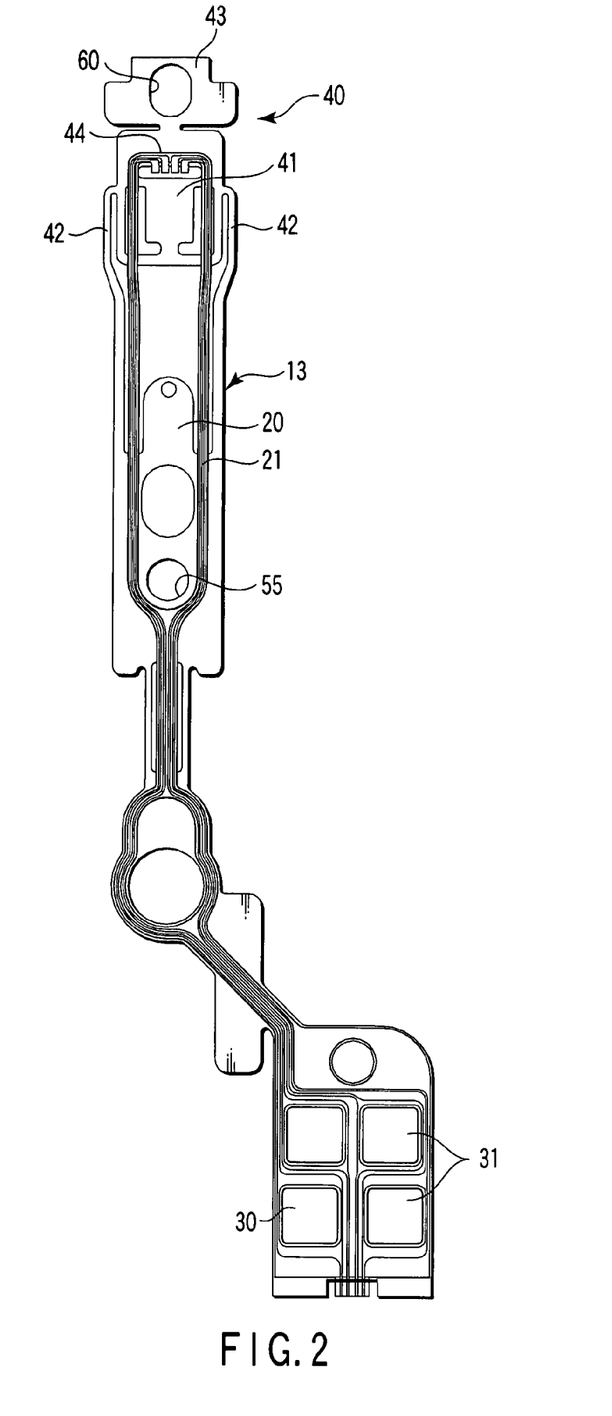
FIG. 2 is a plan view showing a flexure of the suspension shown in FIG. 1.

As shown in FIG. 2, the flexure 13 is provided with a base metal 20 and a conducting member 21. The base metal 20 is formed of a springy stainless steel plate that is thinner than the load beam 12. The conducting member 21 is arranged along the base metal 20. The conducting member 21 includes a pair of electrically conductive layers through which current for writing flows, a pair of electrically conductive layers through which current for reading flows, an electrically insulating layer formed between the conductive layers and the base metal 20, etc.

The flexure 13 extends along and in the axial direction (longitudinal direction) of the load beam 12. As shown in FIG. 1, a proximal portion 30 of the flexure 13 is situated close to the base plate 11. The proximal portion 30 of the flexure 13 is provided with a terminal portion 31 that electrically connects with the conducting member 21. The terminal portion 31 is connected to a control circuit (not shown) of the disc drive apparatus.

Figure 3:
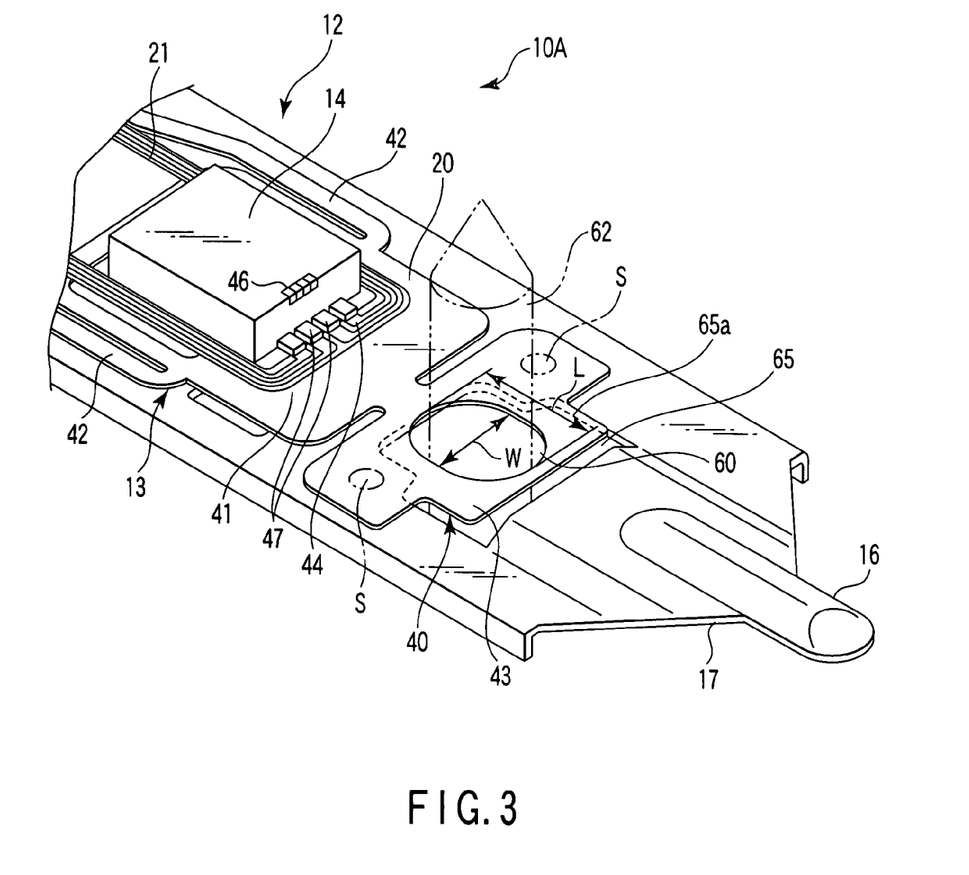
FIG. 3 is an enlarged perspective view showing a part of the suspension shown in FIG. 1.

As shown in FIG. 2, a tongue portion 41 to which the slider 14 is attached, a pair of outrigger portions 42, and an extending portion 43 are formed near a distal portion 40 of the flexure 13. The outrigger portions 42 are situated individually on the opposite sides of the tongue portion 41. The extending portion 43 protrudes from the distal of the flexure 13. The tongue portion 41 is provided with pads 44 for use as electrodes. The pads 44 are situated at the terminal end of the conducting member 21. The tongue portion 41, outrigger portions 42, and extending portion 43, which constitute a part of the base metal 20, are formed into predetermined shapes by etching. The tongue portion 41 and the outrigger portions 42 can individually elastically bend in their thickness direction. As shown in FIGS. 1 and 3, the extending portion 43 is confined to a region inside the distal portion 17 of the load beam 12.

The tongue portion 41 is configured to engage a dimple 45 (shown in FIGS. 4 and 5) that is formed on the load beam 12. The dimple 45 is a hemispherical protuberance that projects toward a substantially central portion of the tongue portion 41. The slider 14 can swing integrally with the tongue portion 41 in a pitch direction and a roll direction around the dimple 45. In order to enable the slider 14 to swing correctly, the slider 14 is fixed in a predetermined position on the tongue portion 41 based on the dimple 45 as a reference.

As shown in FIG. 3, an element 46 is provided on a distal portion of the slider 14. The element 46 functions as a transducer for access to discs. The element 46 electrically connects with terminals 47. The terminals 47 are disposed on the front side of the slider 14. They are electrically connected to their corresponding pads 44 by bonding.

Figure 4:
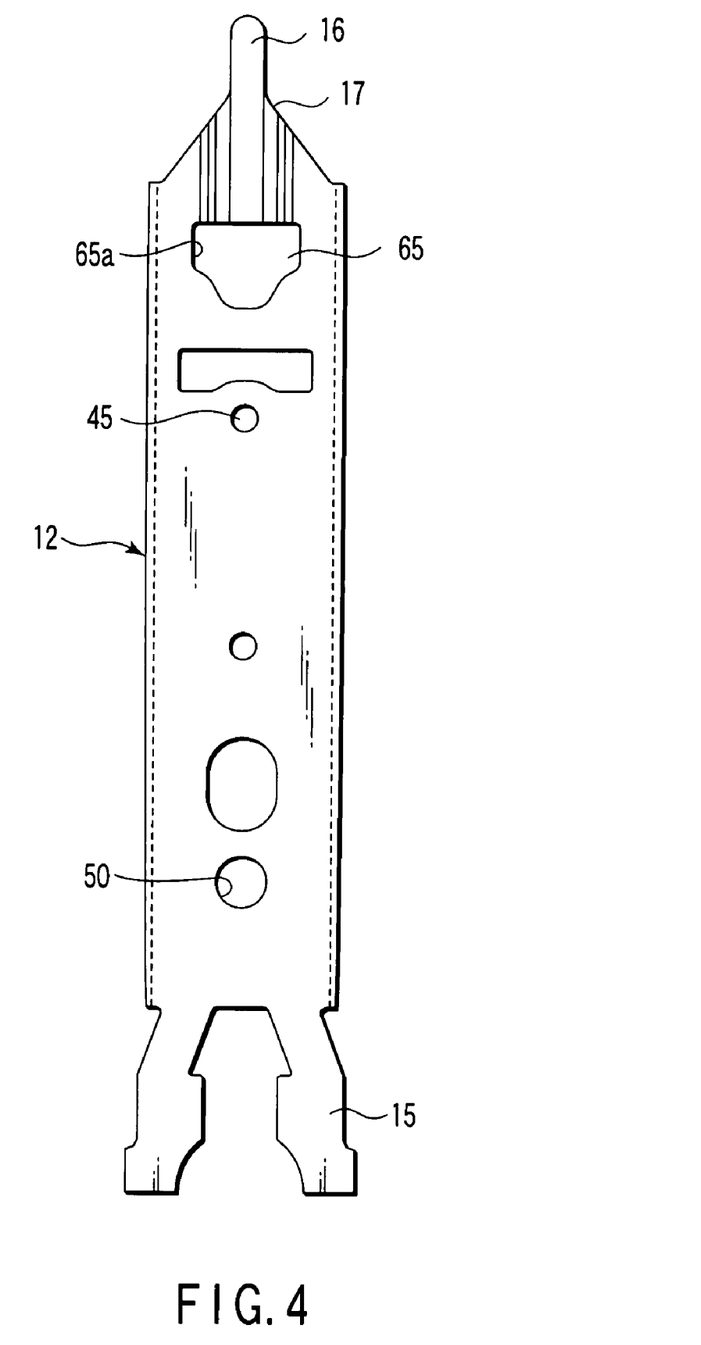
FIG. 4 is a plan view showing a load beam of the suspension shown in FIG. 1.
Figure 5:
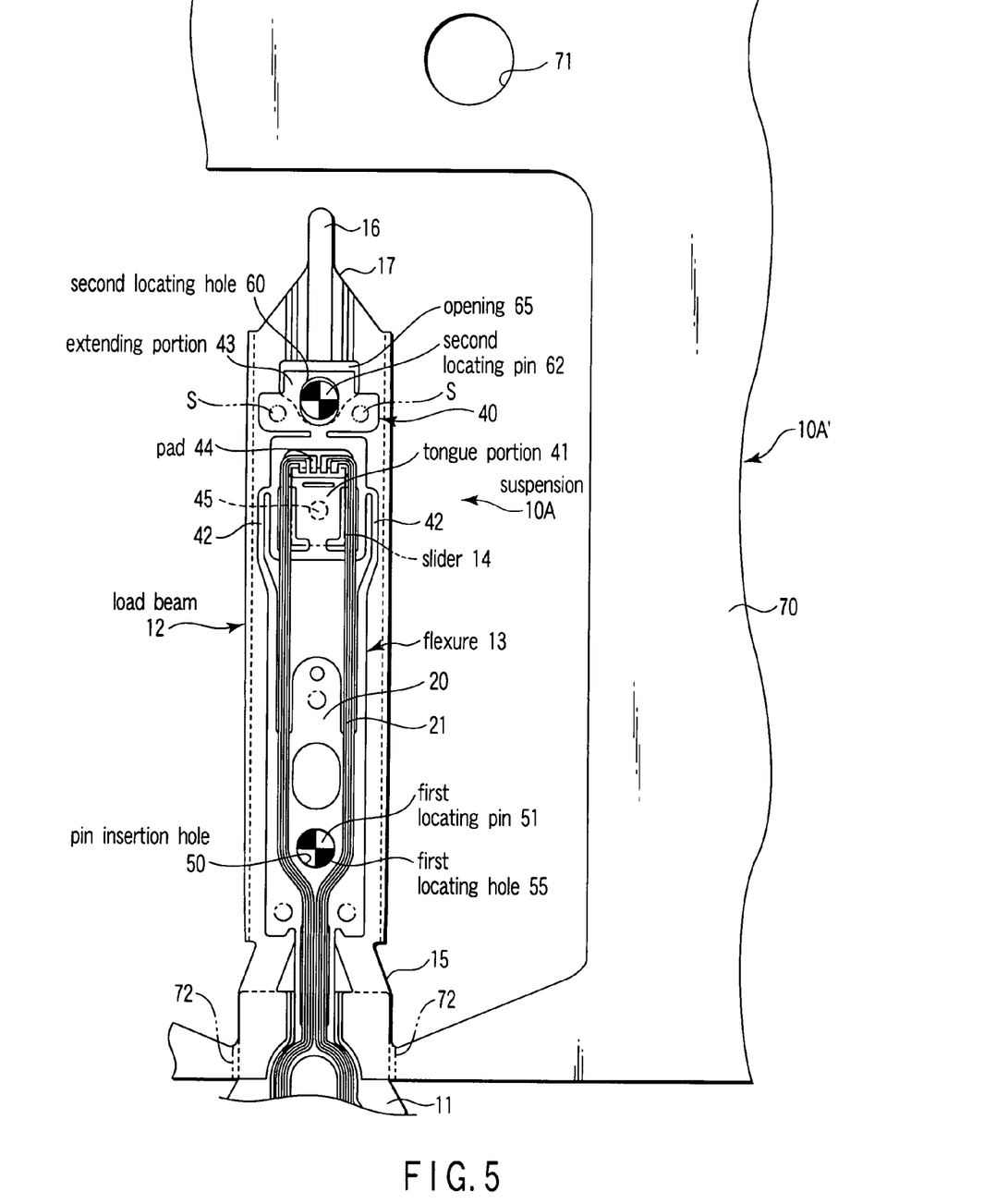
FIG. 5 is a plan view showing a state before the suspension shown in FIG. 1 is separated from a frame.

As shown in FIGS. 4 and 5, a pin insertion hole 50 is formed in a longitudinally intermediate portion of the load beam 12, that is, between the proximal portion 15 of the load beam 12 and the slider 14. As shown in FIGS. 2 and 5, a first locating hole 55 is formed in a longitudinally intermediate portion of the flexure 13. The pin insertion hole 50 and the first locating hole 55 are perfectly circular through holes. As a columnar first locating pin 51 is inserted into the holes 50 and 55, the respective longitudinally intermediate portions of the load beam 12 and the flexure 13 are positioned (with respect to the transverse direction).

As shown in FIG. 2, a second locating hole 60 is formed in the extending portion 43 at the distal portion 40 of the flexure 13. A columnar second locating pin 62 (shown in FIGS. 3 and 5) can be inserted into the second locating hole 60. The width W (shown in FIG. 3) of the second locating hole 60 is substantially equal to or a little larger than the diameter of the second locating pin 62. The length L of the second locating hole 60 is a little larger than the diameter of the pin 62.

The second locating hole 60 has an elongated shape that extends along the longitudinal direction (axial direction) of the flexure 13. When the second locating pin 62 is inserted into the hole 60, that part of the flexure 13 near the distal portion 40 is positioned with respect to the transverse direction. Since the second locating hole 60 has the elongated shape, it can absorb some variation of the size of the flexure 13 in the longitudinal direction.

An opening 65 is formed near the distal portion 17 of the load beam 12, corresponding in position to the second locating hole 60. The opening 65 is sufficiently larger than the diameter of the second locating pin 62 and larger than the second locating hole 60. When the second locating pin 62 is in the second locating hole 60, therefore, it is prevented from touching a peripheral edge 65a of the opening 65.

FIG. 5 shows a semifinished suspension 10A' obtained before the load beam 12 is separated from a frame 70 in a manufacturing process for the suspension 10A. A pin insertion hole 71 is formed in the frame 70. If a pin of a positioning jig is inserted into the pin insertion hole 71, the frame 70 is fixed in a predetermined position on the jig. In consequence, the load beam 12 is held in a predetermined position.

As shown in FIG. 5, the flexure 13 is lapped on the load beam 12. In this state, the first locating pin 51 is inserted into the pin insertion hole 50 of the load beam 12 and the first locating hole 55 of the flexure 13. Further, the second locating pin 62 is inserted into the second locating hole 60 of the flexure 13 and the opening 65 of the load beam 12. Furthermore, the pin of the positioning jig is inserted into the pin insertion hole 71 of the frame 70.

In the suspension 10A of the present embodiment, the second locating hole 60 is formed in the extending portion 43 of the flexure 13 that is situated inside the distal portion 17 of the load beam 12. Therefore, the second locating hole 60 is situated very close to the pads 44. The flexure 13 is positioned as the second locating pin 62 is inserted into the second locating hole 60. Thus, the pads 44 can be positioned accurately.

After the load beam 12 and the flexure 13 are positioned in this manner, they are clamped in their thickness direction by a clamp mechanism (not shown). Then, the load beam 12 and the flexure 13 are fixed to each other by fixing means such as laser welding. In FIGS. 3 and 5, reference numeral S designates each of weld portions formed by laser spot welding.

After the load beam 12 and the flexure 13 are fixed together, cutoff portions 72 between the load beam 12 and the frame 70 are cut. Thereupon, the suspension 10A can be separated from the frame 70.

The slider 14 is placed on the tongue portion 41 and fixed to it with an adhesive or the like. The slider 14 is fixed to the tongue portion 41 with the dimple 45 as a reference so that the dimple 45 is situated in the transverse center of the slider 14.

In the suspension 10A of the present embodiment, as described above, the position of the pads 44 of the flexure 13 is accurately regulated with respect to the load beam 12 by means of the second locating pin 62. Thus, the positional relationship between the pads 44 and the terminals 47 of the slider 14 can be accurately regulated by fixing the slider 14 to the tongue portion 41 with the dimple 45 as a reference.

After the slider 14 is fixed to the tongue portion 41, the pads 44 and the terminals 47 of the slider 14 are electrically connected by bonding. Since the terminals 47 of the slider 14 are accurately positioned with respect to the pads 44, as described above, the terminals 47 of the slider 14 and the pads 44 can be accurately bonded to one another.

In the suspension 10A of the present embodiment, both the locating holes 55 and 60 of the flexure 13 are formed inside the load beam 12. The second locating hole 60, in particular, is confined to a region inside the distal portion 17 of the load beam 12. In the conventional suspension 100 shown in FIG. 8, in contrast, the locating hole 104 is formed in the extending portion 106 that projects outward from the load beam 101. Thus, the flexure 13 of the suspension 10A of the present embodiment can be shorter overall than that of the conventional suspension.

A plurality of flexures 13 are simultaneously manufactured by etching one metal plate. Since the overall length of the flexure 13 of the present embodiment is less than that of the conventional suspension 100 shown in FIG. 8, the number of flexures 13 that can be made from one metal plate can be made greater than in the case of the conventional flexures. Thus, according to the present embodiment, the manufacturing cost of each flexure 13 can be reduced.

In the present embodiment, moreover, the relatively large opening 65 to be penetrated by the second locating pin 62 is formed near the distal portion 17 of the load beam 12. Thus, the mass of that part of the load beam 12 near the distal portion 17 can be reduced.

Figure 6:
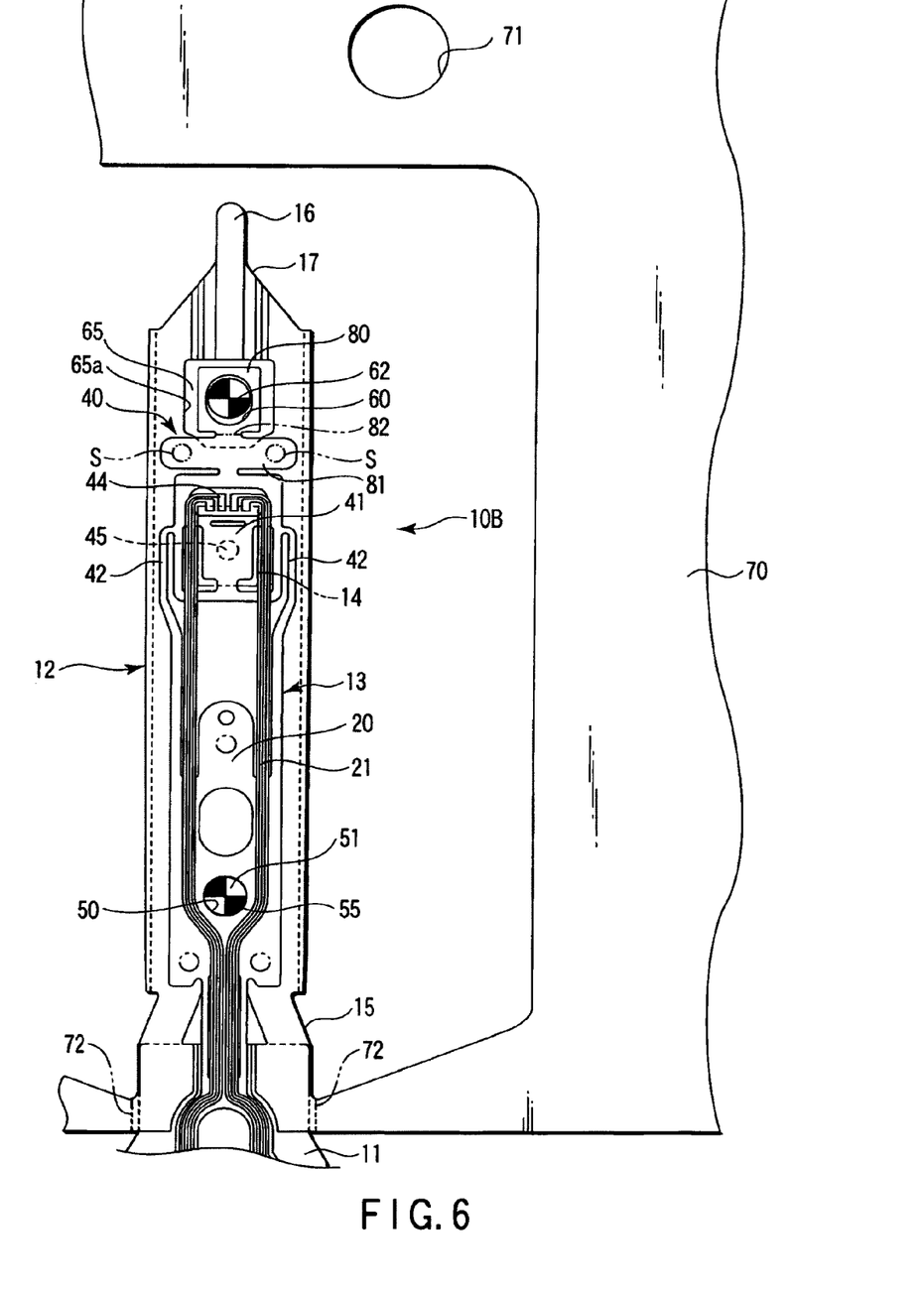
FIG. 6 is a plan view showing a state before a suspension according to a second embodiment of the invention is separated from a frame.

FIG. 6 shows a suspension 10B according to a second embodiment of the invention. The suspension 10B differs from the suspension 10A of the first embodiment in the shapes of a distal portion 17 of a load beam 12 and a distal portion 40 of a flexure 13. For other configurations, the suspension 10B resembles the suspension 10A of the first embodiment, so that common reference numerals are used to designate common portions of the two suspensions, and a description of those portions is omitted. The following is a description of different portions only.

As shown in FIG. 6, an extending portion 80 is formed on the distal portion 40 of the flexure 13 of the suspension 10B of the second embodiment. A second locating hole 60 is formed in the extending portion 80. An opening 65 is formed near the distal portion 17 of the load beam 12. The area of the opening 65 is larger than that of the extending portion 80. The entire extending portion 80 is exposed through the opening 65.

A fixing portion 81 is provided between the extending portion 80 of the flexure 13 and the tongue portion 41. It serves to fix the flexure 13 to the load beam 12. A cutoff portion 82 is provided between the extending portion 80 and the fixing portion 81. The cutoff portion 82 is cut with the flexure 13 fixed to the load beam 12. For example, the cutoff portion 82 is cut after the load beam 12 and the flexure 13 are fixed to each other by laser welding or the like. Thereupon, the extending portion 80 is separated from the flexure 13. In FIG. 6, reference numeral S designates each of weld portions formed by laser spot welding.

The extending portion 80 of the suspension 10B of the second embodiment can be separated after the load beam 12 and the flexure 13 are fixed to each other. Thus, the unfixed extending portion 80 can be prevented from remaining in an unstable state near the distal portion 40 of the flexure 13, and the distal portion 40 of the flexure 13 can be made lighter.

Figure 7:
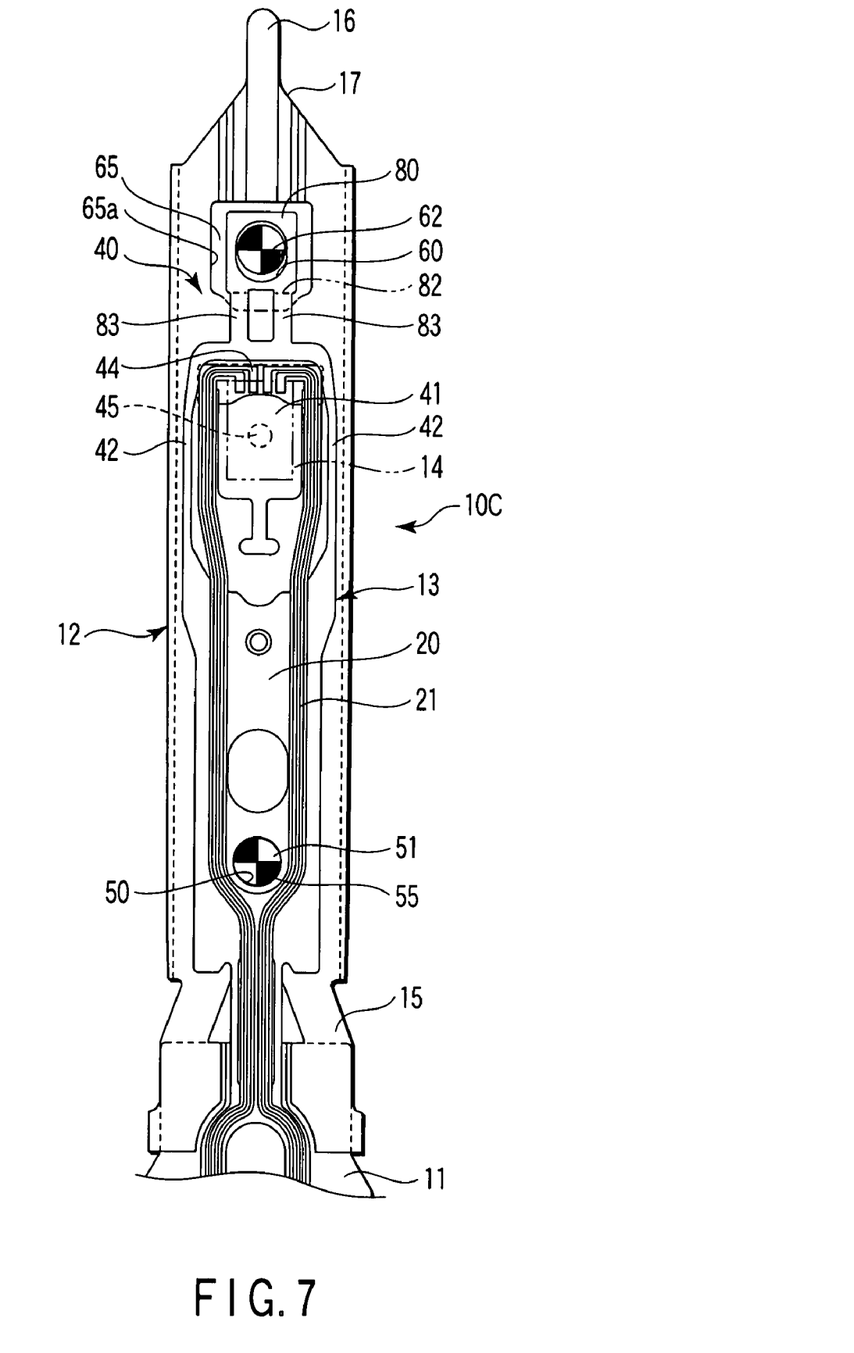
FIG. 7 is a plan view showing a part of a suspension according to a third embodiment of the invention.

FIG. 7 shows a suspension 10C according to a third embodiment of the invention. An extending portion 80 and junctions 83 are formed on a distal portion 40 of a flexure 13 of the suspension 10C. A second locating hole 60 is formed in the extending portion 80. An opening 65 is formed near a distal portion 17 of a load beam 12. The area of the opening 65 is larger than that of the extending portion 80. The entire extending portion 80 is exposed through the opening 65.

The junction 83 is provided with a cutoff portion 82. The cutoff portion 82 is cut after the flexure 13 is fixed to the load beam 12. The junction 83 is in a free state without being fixed to the load beam 12. For other configurations, the suspensions 10C resembles the suspension 10B of the second embodiment shown in FIG. 6, so that common reference numerals are used to designate common portions of the suspensions 10B and 10C, and a description of those portions is omitted. The extending portion 80 of the suspension 10C of the third embodiment can be also separated, so that the distal portion 40 of the flexure 13 can be made lighter.

It should understood, in carrying out the present invention, that the components of the suspension, including the pin insertion hole, opening, first and second locating holes, etc., as well as the load beam and the flexure, may be variously modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive apparatus, comprising:
   a load beam having a proximal portion and a distal portion; and
   a flexure extending along a longitudinal direction of the load beam, and fixed overlapping the load beam and having a tongue portion to which a slider is attached,
   wherein the load beam includes a pin insertion hole which is formed between the proximal portion of the load beam and the slider and in which a first locating pin is inserted, and an opening which is formed between the distal portion of the load beam and the slider and in which a second locating pin is inserted, and
   wherein the flexure includes: (i) a pad which is formed at a position corresponding to a terminal of the slider and to which the terminal is connected, (ii) an extending portion formed so as to be situated between the pad of the flexure and the distal portion of the load beam and inside the distal portion of the load beam, (iii) a first locating hole which is formed in a longitudinally intermediate portion of the flexure and in which the first locating pin is inserted, and (iv) a second locating hole which is formed in the extending portion and in which the second locating pin is inserted,
   wherein the second locating hole has an elongated shape that extends along a longitudinal direction of the flexure, the opening being wider and longer than the second locating hole, and the opening having a peripheral edge provided away from the second locating pin so as not to contact the second locating pin.

2. A suspension for a disc drive apparatus according to claim 1, wherein the extending portion of the flexure is provided with a weld portion by which the extending portion is fixed to the load beam.

3. A suspension for a disc drive apparatus according to claim 1, wherein the extending portion is located inside the opening of the load beam, and wherein the suspension further comprises:
   a fixing portion for fixing the flexure to the load beam, the fixing portion being formed between the extending portion and the tongue portion, and
   a cutoff portion for separating the extending portion, the cutoff portion being formed between the extending portion and the fixing portion and configured to be cut with the flexure fixed to the load beam.

* * * * *